(12) United States Patent
Kleinmann

(10) Patent No.: US 7,734,575 B1
(45) Date of Patent: Jun. 8, 2010

(54) SYSTEM, METHOD, AND COMPUTER PROGRAM PRODUCT FOR SCALEABLE DATA COLLECTION AND AUDIENCE FEEDBACK

(75) Inventor: Amit Kleinmann, Tel-Aviv (IL)

(73) Assignee: Amdocs Software Systems Limited, Dublin (IE)

( * ) Notice: Subject to any disclaimer, the term of this patent is extended or adjusted under 35 U.S.C. 154(b) by 403 days.

(21) Appl. No.: 11/281,740

(22) Filed: Nov. 16, 2005

(51) Int. Cl.
*G06F 17/00* (2006.01)
*G06F 17/30* (2006.01)

(52) U.S. Cl. .................. 707/602; 707/999.1; 707/603; 707/608

(58) Field of Classification Search ................ 707/100; 709/203; 705/14
See application file for complete search history.

(56) References Cited

U.S. PATENT DOCUMENTS

| | | | | |
|---|---|---|---|---|
| 5,280,547 | A * | 1/1994 | Mahoney | 382/302 |
| 5,956,026 | A * | 9/1999 | Ratakonda | 715/723 |
| 6,178,382 | B1 * | 1/2001 | Roederer et al. | 702/21 |
| 6,282,546 | B1 * | 8/2001 | Gleichauf et al. | 707/102 |
| 6,321,338 | B1 * | 11/2001 | Porras et al. | 726/25 |
| 6,397,191 | B1 * | 5/2002 | Notani et al. | 705/9 |
| 6,757,710 | B2 * | 6/2004 | Reed | 709/203 |
| 6,771,626 | B1 * | 8/2004 | Golubiewski et al. | 370/336 |
| 6,820,135 | B1 * | 11/2004 | Dingman et al. | 709/246 |
| 6,904,408 | B1 * | 6/2005 | McCarthy et al. | 705/2 |
| 6,904,464 | B1 * | 6/2005 | Van Langen et al. | 709/237 |
| 2002/0160745 | A1 * | 10/2002 | Wang | 455/404 |
| 2003/0061242 | A1 * | 3/2003 | Warmer et al. | 707/200 |
| 2003/0070183 | A1 | 4/2003 | Pierre et al. | 725/135 |
| 2004/0034638 | A1 * | 2/2004 | Brown et al. | 707/10 |
| 2004/0122735 | A1 * | 6/2004 | Meshkin | 705/14 |
| 2006/0168338 | A1 * | 7/2006 | Bruegl et al. | 709/240 |
| 2006/0248045 | A1 * | 11/2006 | Toledano et al. | 707/2 |

FOREIGN PATENT DOCUMENTS

WO 2004/112404 12/2004

OTHER PUBLICATIONS

Ehab Salem A-Shaer, "A Hierarchical Filtering-Based Monitoring Architecture For Large-Scale Distributed System", 1998, Old Dominion University, All pages.*
Thomas F. Stafford, SPYWARE: The Ghost in the Machine, Communications of the Association for Information Systems, vol. 14, 2004, p. 291-306.*

* cited by examiner

*Primary Examiner*—Yicun Wu
*Assistant Examiner*—Yu Zhao
(74) *Attorney, Agent, or Firm*—Zilka-Kotab, PC

(57) ABSTRACT

A system, method and computer program product are provided for scalable data collection. Input is received from users of client devices, utilizing agents. Further, records are formatted with a predetermined format representative of the input, utilizing the agents. In addition, a priority is dynamically assigned to the records according to a policy, utilizing the agents. At least one of a plurality of server devices is also identified based on a load balancing algorithm, utilizing the agents. Further, the records are transmitted from the client devices to the identified server device as a function of the priority. Upon receipt of the records, the records are processed utilizing a hierarchical architecture associated with the at least one server device.

19 Claims, 4 Drawing Sheets

SYSTEM, METHOD, AND COMPUTER PROGRAM PRODUCT FOR SCALEABLE DATA COLLECTION AND AUDIENCE FEEDBACK

FIELD AND BACKGROUND OF THE INVENTION

The present invention relates to networking, and more particularly, to systems for data collection.

SUMMARY

A system, method and computer program product are provided for scalable data collection. Input is received from users of client devices, utilizing agents. Further, records are formatted with a predetermined format representative of the input, utilizing the agents. In addition, a priority is dynamically assigned to the records according to a policy, utilizing the agents. At least one of a plurality of server devices is also identified based on a load balancing algorithm, utilizing the agents. Further, the records are transmitted from the client devices to the identified server device as a function of the priority. Upon receipt of the records, the records are processed utilizing a hierarchical architecture associated with the at least one server device.

DETAILED DESCRIPTION

Figure 1:
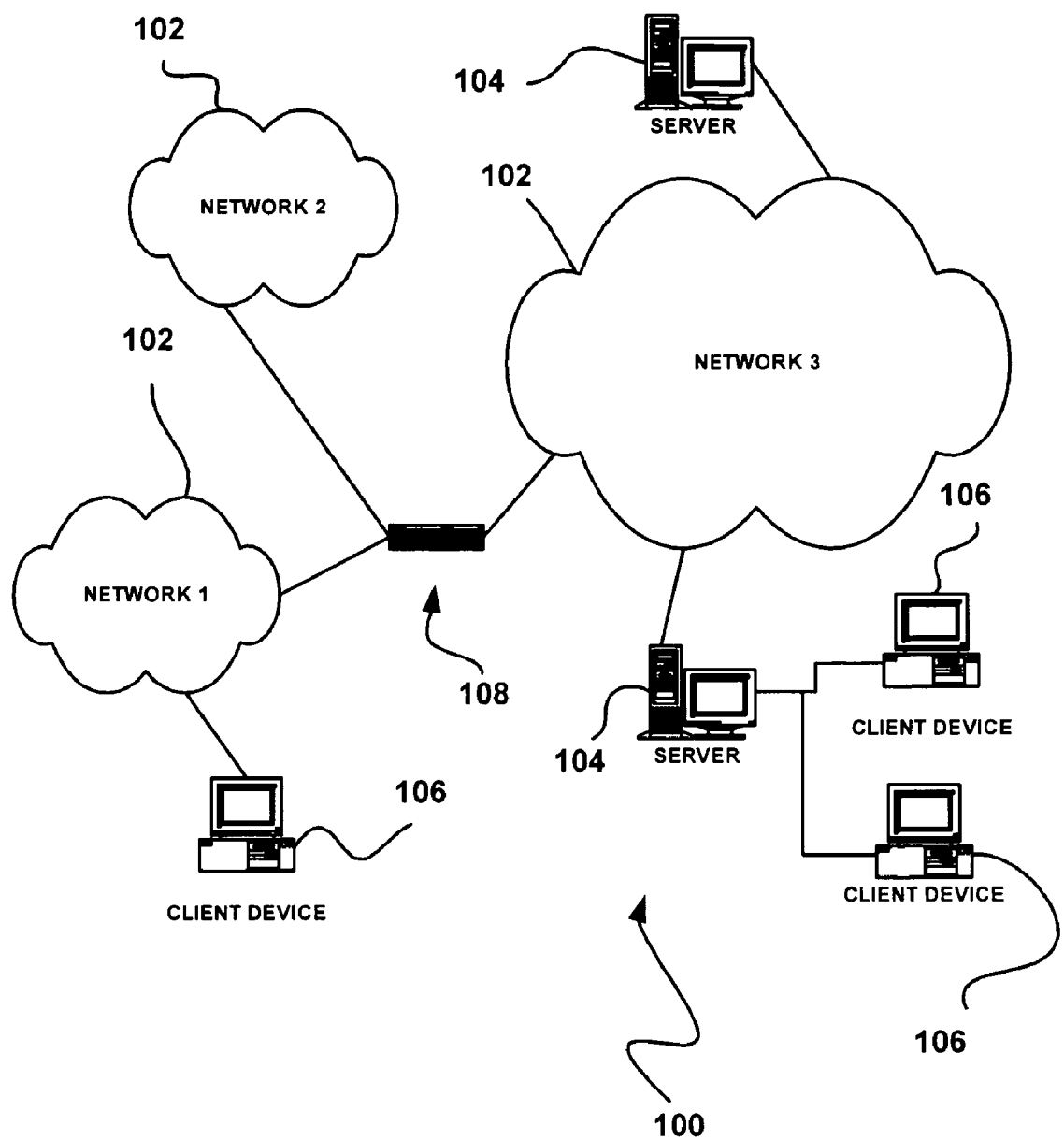
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), Metropolitan Area Network (MAN), wireless network, wide area network (WAN) such as the Internet, cable television network utilizing a hybrid fiber coax (HFC), digital subscriber line (DSL) based network, fiber optic network, a fiber to the x (FTTx) network, wireless network, worldwide interoperability for microwave access (WiMAX) network, etc.

Coupled to the networks 102 are server devices 104 which are capable of communicating over the networks 102. Such server devices 104 may each include a network switch, cable modem termination system (CMTS), server computer and/or any other type of logic. Also coupled to the networks 102 and the server devices 104 is a plurality of client devices 106. Such client devices 106 may each include a desktop computer, lap-top computer, hand-held computer, television (digital and/or analog), television set-top box (digital and/or analog), personal video recorder (PVR), mobile phone, hand-held computer, radio (satellite and/or terrestrial), and/or any other type of logic. In order to facilitate communication among the networks 102, at least one gateway or router 108 is optionally coupled therebetween.

Figure 2:
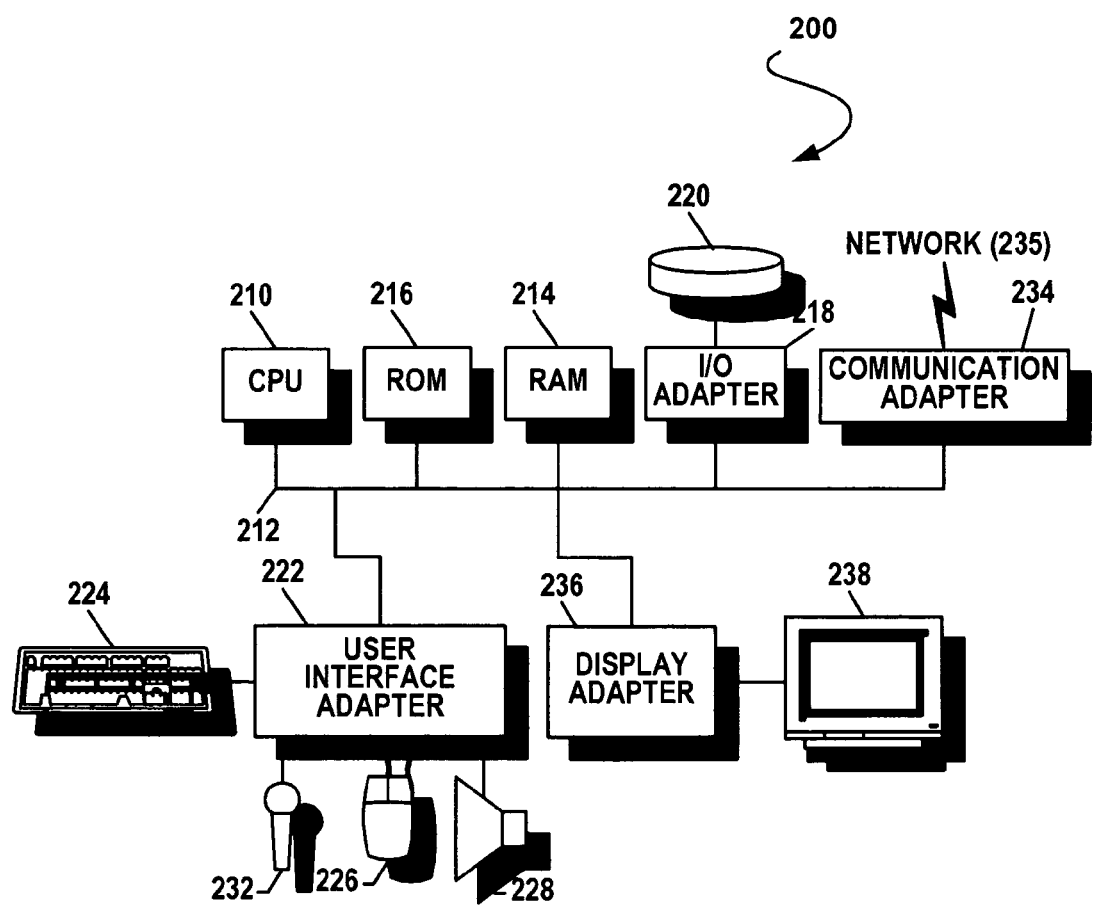
FIG. 2 shows a representative hardware environment that may be associated with the server devices and/or client devices of FIG. 1, in accordance with one embodiment.

FIG. 2 shows a representative hardware environment that may be associated with the server devices 104 and/or client devices 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
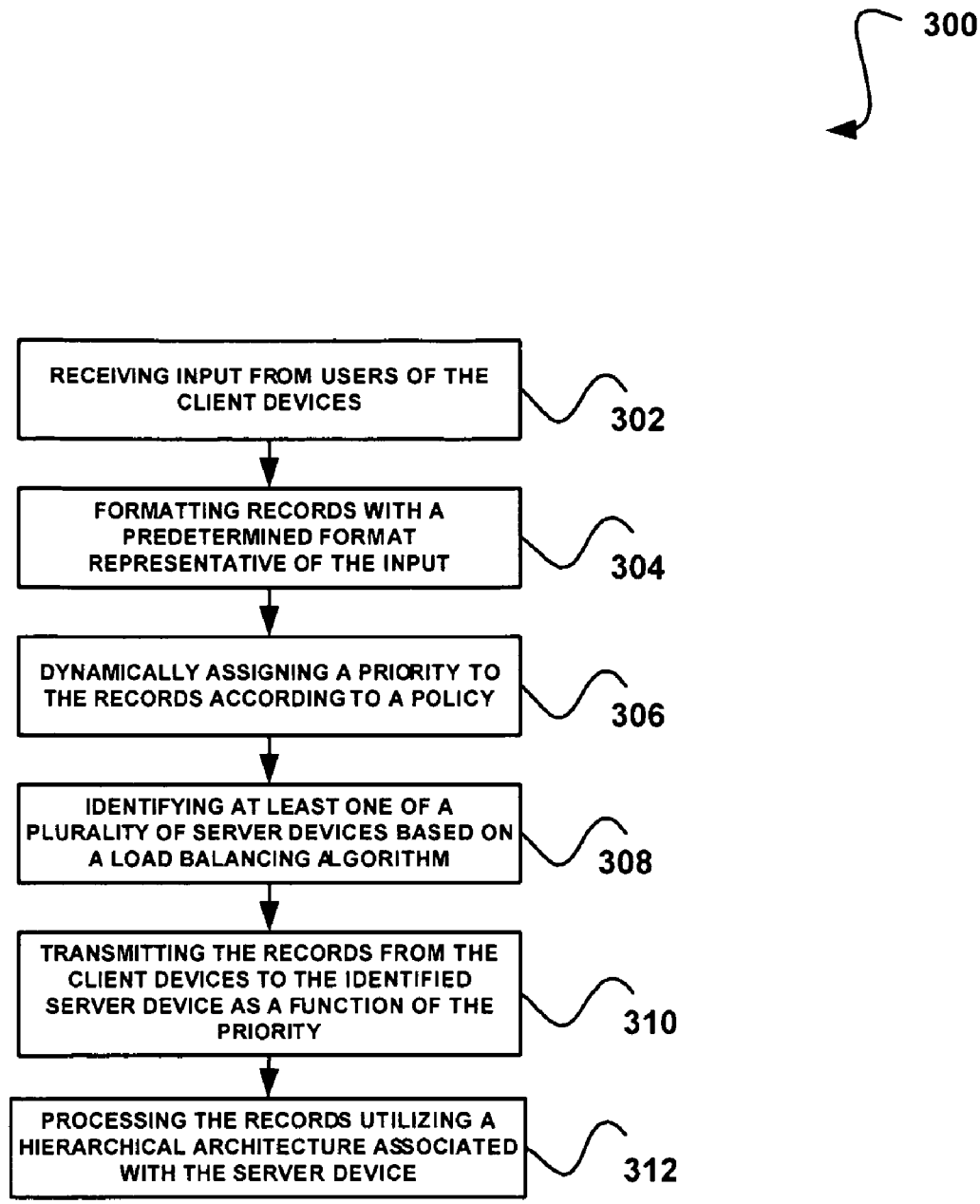
FIG. 3 shows a method for scalable data collection, in accordance with one embodiment.

FIG. 3 shows a method 300 for scalable data collection, in accordance with one embodiment. As an option, the method 300 may be implemented in the context of the architecture and environment of FIGS. 1 and/or 2. Of course, however, the method 300 may be carried out in any desired environment.

As shown in operation 302, input is received from users of client devices (e.g. see, for example, the client devices 106 of FIG. 1, etc.). The input may be received utilizing agents residing at the client devices, such that, for instance, a single agent resides on each client device for receiving input. Furthermore, the input may be received from each agent utilizing a network. The network may include any type of network (e.g. see, for example, the network(s) 102 of FIG. 1, etc.). Furthermore, the network may, in one embodiment, be managed by a single administrative authority. In this way, the client devices may be placed throughout the network.

As an option, the input may be received in response to content that is broadcasted to the client devices. Just by way of example, a television show may be broadcasted to a plurality of viewer's televisions and the viewers may provide input such as changing the channel, skipping a commercial, etc. In another example, input may be received from a plurality of mobile phones in response to an emergency situation. Furthermore, input may be received from a plurality of client computers in a voting situation (where an associated questionnaire may optionally be assembled in near real-time).

As another option, the input may be received by monitoring an interaction between the client devices and users of the client devices. Such monitoring may be performed utilizing agents residing at the client devices. Thus, in the example where the input is in response to a broadcasted television show, the actions of users viewing the television show may be monitored. Of course, any sort of interaction between a client device and user of the client device may be monitored for receiving input. Utilizing a multitude of agents in this way may allow for large amounts of data to be received.

Records are then formatted with a predetermined format representative of the input, as shown in operation 304. Again, the records may be formatted utilizing agents residing at the client devices and/or modules residing at intermediate server devices. The records may also be formatted utilizing a template associated with the predetermined format. For example, the records may be formatted by including only values for each field of a particular type of input. Further, the records may be a binary encoding of the values. A particular template may then be referred to by each record, where the template describes a layout of the type of data the record stores. In this way, field names, types and lengths do not need to be included in the record but instead may be included in the template. Additionally, multiple records may reference a single template. As an option, an XML schema may be utilized for the template. Further, template extensions may be generated by creating a new XML schema.

The records may further include meta data information, such as, for example, references to a domain specific ontology, which in turn references a specific template. The references may be provided by a comprehensive ontology database. In this way, a plurality of data formats may be utilized since multiple domain specific ontology's may be referenced.

As an option, the meta data may include information associated with systems for exporting the records. Such meta data may be provided by a data repository. Formatting the records in this way may allow for less time in processing the input along with less time in accessing the input. Such processing will be described in greater detail with respect to operation 312. In addition, utilizing this type of formatting may allow for new types of input to be easily dealt with by simply requiring a new template for the new type of data.

Each record may also be dynamically assigned a priority according to a policy, as illustrated in operation 306. Yet again, the priority may be assigned utilizing agents residing at the client devices, and/or modules residing at intermediate server devices. Thus, systems that export the records may export the records according to the assigned priority. Furthermore, the policy may be configured. As an option, the policy may be configured to assign priorities based on classes of records. For instance, the policy may be configured to assign priorities based on domain specific ontology's associated with the meta data of the record. As another example, samples of record types may be assigned a high priority, thus providing for faster input collection (which will be described in more detail with respect to operation 310) of the sample record types.

At least one of a plurality of server devices (e.g. see, for example, the server device 104 of FIG. 1, etc.) may also be identified in operation 308 based on a load balancing algorithm. Again, the server devices may be identified utilizing agents residing at the client devices. Thus, a plurality of server devices may be placed throughout the network. The load balancing algorithm may optionally provide a way of determining a current and expected load on each of the plurality of server devices. In this way, only reliable server devices actually capable of receiving data may be identified.

The records may then be transmitted from the client devices to the identified server device(s) as a function of the priority, as shown in operation 310. Thus, the records which include the user input may be collected at server devices with a load permitting such collection. In this way, records may not be transmitted to server devices that are unable to handle such records. Furthermore, the records may be transmitted as a function of the priority such that, for example, the records are transmitted to the identified server devices of operation 308 in order according to the priority. In this way, records with a higher priority may be transferred prior to records with a lower priority. Also, the systems that export the data may dynamically direct each record to a particular server device, such that each record is only transmitted once to a specific server device.

The records may also be processed utilizing a hierarchical architecture associated with the server device, as in operation 312. The records may be processed according to meta data included in the records, as described with respect to operation 304. Thus, records may be processed according to a domain specific ontology. In one instance, the records may be processed by filtering the records. Such filtering may optionally include hierarchical filtration of the records such that a first layer of filtering and a second layer of filtering may be performed on the records. The records may also be processed by aggregating the records. Similarly, such aggregating may optionally include hierarchical aggregation of the records such that a first layer of aggregation and a second layer of aggregation may be performed involving the records.

Still yet, the records may be processed by summarizing the records. Yet again, the records may be summarized hierarchically such that a first and second layer of summarization involving the records may be performed. Additionally, the records may be processed by analyzing the records. Such analysis may be hierarchical and may include performing a first layer of analysis involving the records without a summarization of the records, and performing a second layer of analysis involving the records with a summarization of the records.

In addition, the records may be analyzed according to a domain specific ontology referenced in the record. Thus, the analysis may utilize a domain specific comprehensive ontology database for analyzing the records. Utilizing a hierarchy for processing the records as described above, each layer for each type of processing may only process specific records, thus limiting the time necessary for processing the records. Just by way of example, a first layer may filter a large collection of records and a second layer may provide summaries on the filtered records provided by the first layer.

The records may optionally be processed in real-time and in parallel. Furthermore, a policy may be utilized in combination with the processing. The policy may optionally be based on rules and may also be configured. Such policy may provide the types and levels of processing required for particular packets. Thus, policies may provide for whether particular records or types of records are filtered, aggregated, summarized and/or analyzed. In addition, the policies may provide a hierarchical level that such processing should be performed in, such as, for example, the number of layers in which the filtering, aggregating, summarizing and/or analyzing should be performed. Further, the policy may define a timeframe during which the records may be processed.

In this way, such policies may allow for scalability according to an amount of input received from client devices. As another option, the records may be stored in a database associated with the server device. The storing of the records may be provided either in parallel with the processing of the records or after the processing of the records in order to maintain a real-time processing of the records.

Therefore, agents and server devices may be utilized for receiving input from client devices and eventually processing the input, as described above. The agents and server devices may further allow for scalability such that a number of agents and/or server devices utilized may be easily customized. For example, a number of agents may depend on a number of client devices coupled to a network and a number of server devices may depend on a function of the number of agents. In this way, the number of agents and server devices utilized may be in proportion to an amount of data being input by users of client devices. Furthermore, such input may also be collected and processed in real-time.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
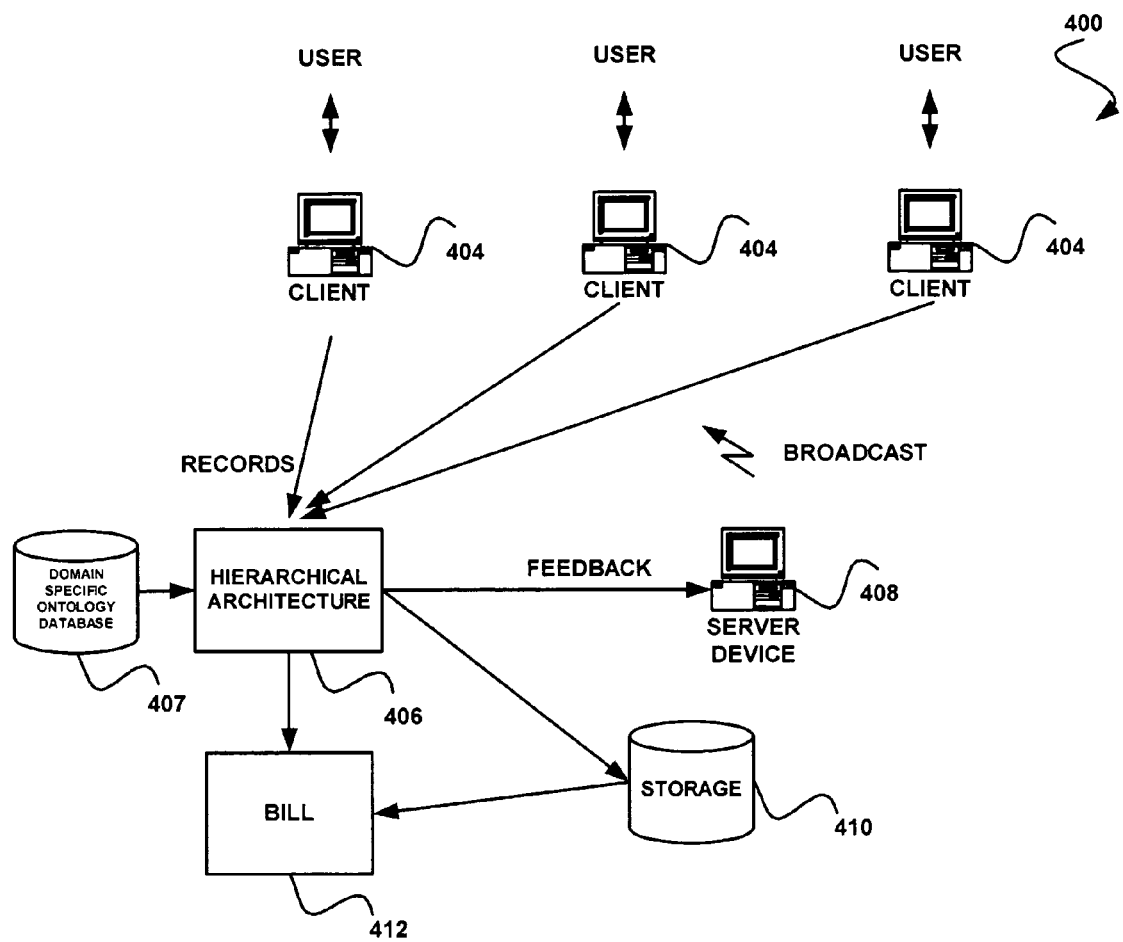
FIG. 4 shows a system for scalable data collection, in accordance with another embodiment.

FIG. 4 shows a system 400 for scalable data collection, in accordance with another embodiment. As an option, the system 400 may be implemented in the context of the architecture and environment of FIGS. 1-3 (including the definitions provided in the description of FIG. 3). Of course, however, the system 400 may be carried out in any desired environment.

The system 400 depicts a plurality of client devices 404 that are each associated with a user. The client devices 404 transmit records to a system 406 employing a hierarchical architecture. The hierarchically architectured system 406 utilizes layers, where each layer is adapted for processing the received records. In addition, a domain specific ontology database 407 may be utilized during the processing of the records. For example, the domain specific ontology database 407 may provide information associated with a particular domain specific ontology for use during the processing of records related to the particular domain specific ontology.

The hierarchically architectured system 406 may transmit feedback to a server device 408. Such feedback may include any information, such as, for example, information associated with the received records and/or processing results of the received records. In parallel with or subsequent to the processing of the records, the records are stored in a storage component 410. Such storage may be any type of storage (e.g. RAM, etc.) and may optionally be remote from the server device 408. Of course, such storage component 410 may also be local to the server device 408. Furthermore, a billing module 412 may be used to generate bills in association with the user input from the storage component 410 and/or from the hierarchically architectured system 406.

As mentioned previously, the present framework may be utilized in many different types of applications such as television shows, emergency situations, voting scenarios, etc. For example, a live television show may be influenced by the audience feedback. In particular, audience feedback to a talk show may cause an interviewer to concentrate on particular interviewees and/or subjects, and may cause an interviewer to present certain questions/comments, end conversations, etc. Still yet, a live program associated with a police investigation may utilize the present framework to obtain feedback, filter and analyze such feedback automatically in real-time, and then proceed with the program according to deduced conclusions. Even still, audience feedback with respect to a stand-up comedy show can influence the performer and make him/her aware of the audience. Further, an audience of a sport event can provide positive/negative inputs and also choose to get the feedback of their friends, in real-time. Also, certain input tools/services can be offered (e.g. rented, sold, etc.) to the audience. Of course, these exemplary applications are not exhaustive, as any desired application may be employed.

As yet another optional feature, reliability may be provided at the application level. Specifically, data collection may be carried out in two different reliability modes: unreliable mode and reliable mode. When data is collected in the reliable mode, an acknowledgment may be sent from the server back to the client as soon as proper processing of a data record is completed. Further, multiple successive acknowledgements may be aggregated and sent as one (aggregated) acknowledgment. Still yet, security may be provided at the application level. For example, data collection may be protected in different security levels to ensure confidentiality, data integrity and non-repudiation as well as to prevent (or reduce) denial of service.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A method, comprising the operations of:
receiving input from users of client devices, utilizing agents;
formatting records with a predetermined format representative of the input, utilizing the agents;
dynamically assigning a priority to the records according to a policy, utilizing the agents;
identifying at least one of a plurality of server devices based on a load balancing algorithm, utilizing the agents;
transmitting the records to the identified server device as a function of the priority; and
upon receipt of the records, processing the records utilizing a hierarchical architecture associated with the at least one server device;
wherein the input is received by monitoring an interaction between the client devices and the users of the client devices, utilizing the agents;
wherein the records are stored in a database associated with the identified server device;
wherein the processing includes analysis;
wherein the analysis includes hierarchical analysis;
wherein the hierarchical analysis includes performing a first layer of analysis involving the records without a summarization, and performing a second layer of analysis involving the records with the summarization;
wherein a template associated with the predetermined format is utilized for formatting the records and is referred to by the records, the records formatted by including only a binary encoding of each of a plurality of values, each of the values associated with a different field of a particular type of input;
wherein the processing is configured based on another policy, the other policy providing which records are filtered, aggregated, summarized and analyzed, the other policy providing a hierarchical level in which the processing is to be performed, including a number of layers in which the filtering, aggregating, summarizing and analyzing is to be performed, and the other policy defining a timeframe during which the processing is to be performed.

2. The method of claim 1, further comprising broadcasting content to a plurality of the client devices.

3. The method of claim 1, wherein the input is received in response to the content broadcasted to the client devices.

4. The method of claim 1, wherein the records each include a reference to a domain specific comprehensive ontology.

5. The method of claim 1, wherein the processing includes filtering.

6. The method of claim 5, wherein the filtering includes hierarchical filtering.

7. The method of claim 6, wherein the hierarchical filtering includes performing a first layer of filtering involving the records, and performing a second layer of filtering involving the records.

8. The method of claim 1, wherein the processing includes aggregating.

9. The method of claim 8, wherein the aggregating includes hierarchical aggregation.

10. The method of claim 9, wherein the hierarchical aggregation includes performing a first layer of aggregation involving the records, and performing a second layer of aggregation involving the records.

11. The method of claim 1, wherein the processing includes the summarizing.

12. The method of claim 11, wherein the summarizing includes hierarchical summarization.

13. The method of claim 12, wherein the hierarchical summarization includes performing a first layer of summarization involving the records, and performing a second layer of summarization involving the records.

14. The method of claim 1, wherein the processing is substantially performed in real-time.

15. A computer program product embodied on a tangible computer readable storage medium, comprising:
  computer code for receiving input from users of client devices;
  computer code for formatting records with a predetermined format representative of the input;
  computer code for dynamically assigning a priority to the records according to a policy;
  computer code for identifying at least one of a plurality of server devices based on a load balancing algorithm;
  computer code for transmitting the records from the client devices to the identified server device as a function of the priority; and
  computer code for processing the records utilizing a hierarchical architecture, upon receipt of the records;
  wherein the input is received by monitoring an interaction between the client devices and the users of the client devices;
  wherein the computer program product is operable such that the records are stored in a database associated with the identified server device;
  wherein the processing includes analysis;
  wherein the analysis includes hierarchical analysis;
  wherein the hierarchical analysis includes performing a first layer of analysis involving the records without a summarization, and performing a second layer of analysis involving the records with the summarization;
  wherein the computer program product is operable such that a template associated with the predetermined format is utilized for formatting the records and is referred to by the records, the records formatted by including only a binary encoding of each of a plurality of values, each of the values associated with a different field of a particular type of input
  wherein the computer program product is operable such that the processing is configured based on another policy, the other policy providing which records are filtered, aggregated, summarized and analyzed, the other policy providing a hierarchical level in which the processing is to be performed, including a number of layers in which the filtering, aggregating, summarizing and analyzing is to be performed, and the other policy defining a timeframe during which the processing is to be performed.

16. A system, comprising:
  at least one agent for receiving input from users of client devices, formatting records with a predetermined format representative of the input, dynamically assigning a priority to the records according to a policy, identifying at least one of a plurality of server devices based on a load balancing algorithm, and transmitting the records from the client devices to the identified server device as a function of the priority;
  wherein the records are processed utilizing a hierarchical architecture, upon receipt of the records;
  wherein the input is received by monitoring an interaction between the client devices and the users of the client devices, utilizing the at least one agent;
  wherein the system is operable such that the records are stored in a database associated with the identified server device;
  wherein the processing includes analysis;
  wherein the analysis includes hierarchical analysis;
  wherein the hierarchical analysis includes performing a first layer of analysis involving the records without a summarization, and performing a second layer of analysis involving the records with the summarization;
  wherein the system is operable such that a template associated with the predetermined format is utilized for formatting the records and is referred to by the records, the records formatted by including only a binary encoding of each of a plurality of values, each of the values associated with a different field of a particular type of input;
  wherein the system is operable such that the processing is configured based on another policy, the other policy providing which records are filtered, aggregated, summarized and analyzed, the other policy providing a hierarchical level in which the processing is to be performed, including a number of layers in which the filtering, aggregating, summarizing and analyzing is to be performed, and the other policy defining a timeframe during which the processing is to be performed.

17. The method of claim 1, wherein the policy is configured to assign a higher priority to samples of record types than to other records.

18. The method of claim 1, wherein the template describes a layout of a type of data the records store and includes field names, types and lengths.

19. The method of claim 1, wherein the records include meta data, the meta data including references to a domain specific ontology which in turn references the template, and the meta data further including information associated with systems for exporting the records.

* * * * *

UNITED STATES PATENT AND TRADEMARK OFFICE
CERTIFICATE OF CORRECTION

| | | |
|---|---|---|
| PATENT NO. | : 7,734,575 B1 | |
| APPLICATION NO. | : 11/281740 | |
| DATED | : June 8, 2010 | |
| INVENTOR(S) | : Amit Kleinmann | |

It is certified that error appears in the above-identified patent and that said Letters Patent is hereby corrected as shown below:

In the claims:
Claim 15, column 7, line 58; please replace "input" with --input;--.

Signed and Sealed this
Twenty-second Day of November, 2011

David J. Kappos
*Director of the United States Patent and Trademark Office*